United States Patent
Kotake et al.

(10) Patent No.: US 12,117,568 B2
(45) Date of Patent: Oct. 15, 2024

(54) LASER RADAR DEVICE

(71) Applicant: Mitsubishi Electric Corporation, Tokyo (JP)

(72) Inventors: Nobuki Kotake, Tokyo (JP); Yutaka Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1058 days.

(21) Appl. No.: 17/029,626

(22) Filed: Sep. 23, 2020

(65) Prior Publication Data
US 2021/0011141 A1 Jan. 14, 2021

Related U.S. Application Data

(63) Continuation of application No. PCT/JP2018/015943, filed on Apr. 18, 2018.

(51) Int. Cl.
*G01S 7/493* (2006.01)
*G01S 7/4913* (2020.01)
*G01S 17/34* (2020.01)
*G01S 17/95* (2006.01)

(52) U.S. Cl.
CPC ............ *G01S 7/493* (2013.01); *G01S 7/4913* (2013.01); *G01S 17/34* (2020.01); *G01S 17/95* (2013.01)

(58) Field of Classification Search
None
See application file for complete search history.

(56) References Cited

U.S. PATENT DOCUMENTS

| 2009/0058713 A1 | 3/2009 | Okunishi et al. |
| 2013/0088380 A1 | 4/2013 | Isoda |
| 2019/0064361 A1 | 2/2019 | Kotake et al. |

FOREIGN PATENT DOCUMENTS

| JP | 2004-347540 A | 12/2004 |
| JP | 2009-75093 A | 4/2009 |
| JP | 2009-300133 A | 12/2009 |
| JP | 2016-211989 A | 12/2016 |

(Continued)

OTHER PUBLICATIONS

WO 2016181493 A1 (Year: 2016).*

(Continued)

*Primary Examiner* — Isam A Alsomiri
*Assistant Examiner* — Sanjida Naser
(74) *Attorney, Agent, or Firm* — Birch, Stewart, Kolasch & Birch, LLP

(57) ABSTRACT

A laser radar device of the present invention includes: an optical oscillator oscillating laser light; an optical modulator modulating the laser light oscillated by the optical oscillator; an optical antenna radiating the laser light modulated by the optical modulator to an atmosphere, and receiving scattered light from a radiation target as received light; an optical receiver performing heterodyne detection on the received light received by the optical antenna; and a signal processor calculating for a range bin a spectrum of a received signal obtained by the heterodyne detection by the optical receiver, calculating a signal to noise ratio of the range bin, and integrating the spectrum of the range bin and spectra of one or more range bins adjacent to the range bin when the signal to noise ratio is less than or equal to a threshold value.

1 Claim, 8 Drawing Sheets

(56) References Cited

FOREIGN PATENT DOCUMENTS

| WO | WO2011/158359 A1 | 12/2011 |
| WO | WO2017/175297 A1 | 10/2017 |

OTHER PUBLICATIONS

WO 2016181493 A1 (translation) (Year: 2016).*
Chinese Office Action and Search Report for corresponding Chinese Application No. 201880092322.X dated Sep. 29, 2023, with English translation.
Extended European Search Report issued on Mar. 2, 2021 to the corresponding European Patent Application No. 18 915 710.1.

* cited by examiner

LASER RADAR DEVICE

CROSS REFERENCE TO RELATED APPLICATIONS

This application is a Continuation of PCT International Application No. PCT/JP2018/015943, filed on Apr. 18, 2018, which is hereby expressly incorporated by reference into the present application.

TECHNICAL FIELD

The present invention relates to a laser radar device.

BACKGROUND ART

A laser radar device is known that can recognize wind speed by emitting laser light into the air and by receiving scattered light reflected by minute liquid or solid particles (aerosol) floating in the atmosphere. In a conventional laser radar device, scattered light from aerosol in the atmosphere is subjected to the Fourier transform for each time gate, whereby frequency spectra of the scattered light for each time are obtained. Then, the frequency spectra for each time are integrated, and a wind speed value in a line-of-sight direction is obtained from the peak value of the integrated frequency spectrum. In contrast, in a laser radar device described in Patent Literature 1, the distance resolution is changed depending on an observation distance in advance, that is, the distance resolution is increased at a short distance where a high SNR is necessarily obtained, and on the other hand, the distance resolution is set low to increase the SNR at a long distance.

CITATION LIST

Patent Literature

Patent Literature 1: JP 2009-300133 A

SUMMARY OF INVENTION

Technical Problem

In the laser radar device, the signal to noise ratio (SNR) at each distance changes depending on a state of an atmospheric environment (aerosol density). When the atmospheric environment is good, it is possible to perform measurement up to a distant place even if a high distance resolution is set, but when the atmospheric environment is bad, it may be required to set a lower distance resolution and change to a setting to obtain a desired SNR. However, for highly accurate wind speed measurement or to measure a local change such as a blast of wind (gust), measurement with a high distance resolution is essential.

To cope with this, in Patent Literature 1, the distance resolution is changed in advance depending on the measurement distance, so that it is necessary to perform measurement again after changing the distance resolution, and there is a problem that it is not possible to follow changes in the atmospheric environment.

Solution to Problem

A laser radar device of the present invention includes: an optical oscillator oscillating laser light; an optical modulator modulating the laser light oscillated by the optical oscillator; an optical antenna radiating the laser light modulated by the optical modulator to an atmosphere, and receiving scattered light from a radiation target as received light; an optical receiver performing heterodyne detection on the received light received by the optical antenna; and a signal processor calculating for a range bin a spectrum of a received signal obtained by the heterodyne detection by the optical receiver, calculating a signal to noise ratio of the range bin, and integrating the spectrum of the range bin and spectra of one or more range bins adjacent to the range bin when the signal to noise ratio is less than or equal to a threshold value. The signal processor includes: a range bin divider dividing the received signal into range bins each having a set fixed time gate width; a fast Fourier transform processor calculating a spectrum of the received signal for each of the range bins, by performing Fourier transform on the received signal divided by the range bin divider at a fixed number of set sampling points; an SNR calculator obtaining the signal to noise ratio with respect to distance, from the spectrum calculated by the fast Fourier transform processor; a resolution changer performing integration of a spectrum of a range bin being one of the range bins and spectra of one or more range bins adjacent to the range bin while maintaining the time gate width, when the signal to noise ratio calculated by the SNR calculator for the range bin is less than or equal to the threshold value; a wind speed calculator calculating a wind speed value of the radiation target from a spectrum obtained as a result of the integration performed by the resolution changer; a wind vector calculator calculating a wind vector from the wind speed value calculated by the wind speed calculator; an SNR model calculator calculating the number of range bins to be integrated from the signal to noise ratio calculated by the SNR calculator and a signal to noise ratio estimated by a link calculation formula; and a wind speed model calculator calculating a wind speed gradient using the wind speed value, the wind speed value being calculated by the wind speed calculator from the spectrum calculated by the fast Fourier transform processor, and estimating a wind speed value by a local wind model when the wind speed gradient calculated is greater than or equal to a threshold value. The resolution changer integrates spectra of the range bins in accordance with the number of range bins to be integrated calculated by the SNR model calculator and in such a manner that wind speed values estimated by the wind speed model calculator match each other.

Advantageous Effects of Invention

According to the present invention, the SNR can be improved after the measurement by changing the distance resolution on signal processing on the basis of a reception SNR obtained by observation, and it is possible to set a high distance resolution in a high SNR region, and set a low distance resolution in a low SNR region.

DESCRIPTION OF EMBODIMENTS

First Embodiment

Figure 1:
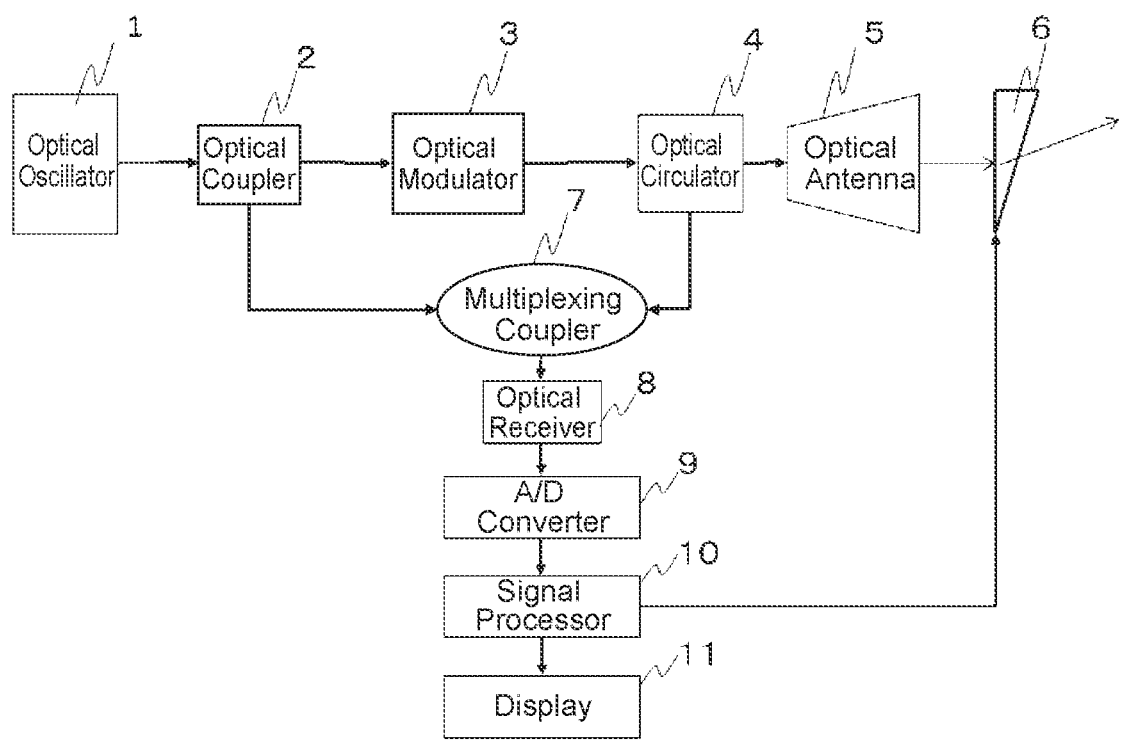
FIG. 1 is a configuration diagram illustrating a configuration example of a laser radar device according to a first embodiment of the present invention.

FIG. 1 is a configuration diagram illustrating a configuration example of a laser radar device according to a first embodiment of the present invention.

This laser radar device includes an optical oscillator 1 (an example of an optical oscillator), an optical coupler 2, an optical modulator 3 (an example of an optical modulator), an optical circulator 4, an optical antenna 5 (an example of an optical antenna), a scanner 6, a multiplexing coupler 7, an optical receiver 8 (an example of an optical receiver), an A/D converter 9, a signal processor 10 (an example of a signal processor), and a display 11.

The optical oscillator 1 oscillates laser light. The optical oscillator 1 is connected to the optical coupler 2 and outputs the oscillated laser light to the optical coupler 2. For example, a semiconductor laser, a solid-state laser, or the like is used for the optical oscillator 1.

The optical coupler 2 causes the laser light output from the optical oscillator 1 to branch into local light and transmission light. The local light refers to light that passes through a path from the optical coupler 2 to the optical receiver 8 via the multiplexing coupler 7, and the transmission light refers to light that passes through a path from the optical coupler 2 to the optical antenna 5 via the optical modulator 3. The optical coupler 2 is connected to the optical oscillator 1, the optical modulator 3, and the multiplexing coupler 7, outputs the local light to the multiplexing coupler 7, and outputs the transmission light to the optical modulator 3. For example, a fused fiber coupler, a filter-type coupler using a dielectric multilayer film filter, or the like is used for the optical coupler.

The optical modulator 3 shifts a frequency of the transmission light output by the optical coupler 2. The optical modulator 3 performs phase modulation or frequency modulation on the transmission light and shifts the frequency of the transmission light. The optical modulator 3 is connected to the optical coupler 2 and the optical circulator 4. For example, an acoust optical (AO) frequency shifter, an optical phase modulator, or the like is used for the optical modulator 3.

The optical circulator 4 separates the transmission light modulated by the optical modulator 3 and received light obtained via the scanner 6 and the optical antenna 5 from each other. Here, the received light is scattered light from aerosol with respect to the transmission light. The optical circulator 4 is connected to the optical modulator 3, the optical antenna 5, and the multiplexing coupler 7, outputs the transmission light to the optical antenna 5, and outputs the received light to the multiplexing coupler 7. For example, a circulator including a wave plate and a beam splitter, or the like, which is a spatial propagation type or a fiber coupling type, is used for the optical circulator 4.

The optical antenna 5 outputs the transmission light output by the optical circulator 4, and receives the scattered light from the aerosol as the received light. The optical antenna 5 is connected to the optical circulator 4 and the scanner 6, outputs the transmission light to the scanner 6, and outputs the received light to the optical circulator 4. For example, an optical telescope or a camera lens is used for the optical antenna 5.

The scanner 6 performs scanning of the transmission light output by the optical antenna 5 and changes an irradiation direction (also referred to as a line-of-sight direction) into the atmosphere. The scanner 6 includes a wedge prism, a motor for rotating the wedge prism, and an encoder. For example, a stepping motor with an encoder is used for the motor. The scanner 6 changes the line-of-sight direction of the wedge prism by rotating the motor at any desired speed, and outputs, to the signal processor 10, information on an angle at which the transmission light is radiated. For example, a wedge prism mirror, a galvano scanner, or the like is used for the scanner 6. Although a method of performing scanning of light output from an optical system is described here, a method may be used of changing the line-of-sight direction by preparing an optical switch for switching optical paths in the preceding stage of the optical system, and by connecting a branch destination to one or more optical systems facing different directions.

The multiplexing coupler 7 is a multiplexing coupler for multiplexing the local light and the received light. The multiplexing coupler 7 is connected to the optical coupler 2, the optical circulator 4, and the optical receiver 8. The multiplexing coupler 7 multiplexes the local light output by the optical coupler 2 and the received light output by the optical circulator 4, and outputs multiplexed light to the optical receiver 8. For example, as the multiplexing coupler 7, a fused fiber coupler, a filter-type coupler using a dielectric multilayer film filter, or the like is used.

The optical receiver 8 is an optical receiver for performing heterodyne detection on the multiplexed light output by the multiplexing coupler 7. The optical receiver 8 is connected to the multiplexing coupler 7 and the A/D converter 9. The optical receiver 8 performs heterodyne detection on the multiplexed light output by the multiplexing coupler 7, converts a detected optical signal into an electric signal, and outputs the electric signal to the A/D converter 9. For example, a balanced receiver or the like is used for the optical receiver 8.

The A/D converter 9 is an analogue to digital (A/D) converter for converting an analog signal subjected to heterodyne detection by the optical receiver 8 into a digital signal. The A/D converter 9 is connected to the optical receiver 8, the optical modulator 3, and the signal processor 10. The A/D converter 9 samples an analog electric signal output by the optical receiver 8 by using a laser pulse trigger signal output by the optical modulator 3 as a trigger, converts the analog signal into a digital signal, and outputs the digital signal to the signal processor 10. For example, a double integral A/D converter, a successive approximation A/D converter, a parallel comparison A/D converter, or the like is used for the A/D converter 9.

The signal processor 10 is a signal processor for calculating a wind speed value and a wind vector by performing signal processing on the digital signal output by the A/D converter 9.

Figure 2:
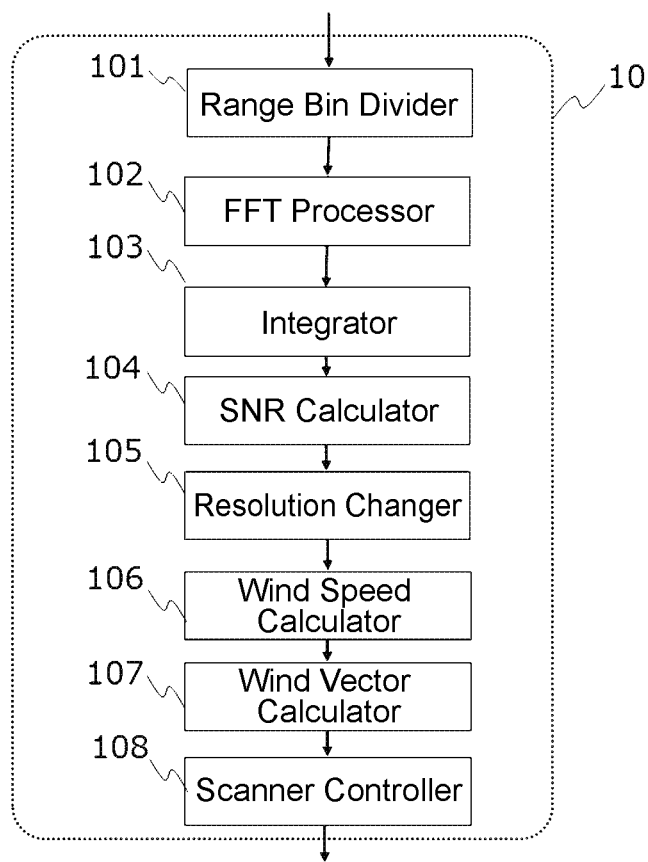
FIG. 2 is a configuration diagram illustrating a configuration example of a signal processor 10 according to the first embodiment of the invention.

FIG. 2 is a configuration diagram illustrating a configuration example of the signal processor 10 according to the first embodiment of the invention.

The signal processor 10 includes a range bin divider 101 (an example of a range bin divider), an FFT processor 102 (an example of a fast Fourier transform processor), an integrator 103, an SNR calculator 104 (an example of an SNR calculator), a resolution changer 105 (an example of a resolution changer), a wind speed calculator 106 (an example of a wind speed calculator), a wind vector calculator 107 (an example of a wind vector calculator), and a scanner controller 108.

The range bin divider 101 divides the digital signal output by the A/D converter 9 into any desired number of range bins. The range bin divider 101 is connected to the A/D converter 9 and the FFT processor 102. The range bin divider 101 divides the digital signal output by the A/D converter 9 into any desired number of range bins, and outputs divided digital signals to the FFT processor 102. Dividing into the range bins means dividing into signals each having a fixed time (time gate width).

The FFT processor 102 performs Fast Fourier Transform (FFT) processing on the signals output by the range bin divider 101. The FFT processor 102 is connected to the range bin divider 101 and the integrator 103. The FFT processor 102 performs a fast Fourier transform on the signals divided into the range bins output by the range bin divider 101 at a fixed number of sampling points for each range bin, and outputs transformed spectrum signals to the SNR calculator 104. When a Fourier transform is performed with a fixed time gate width and a fixed number of sampling points, the number of data points (corresponding to frequency resolution) of the spectrum subjected to the Fourier transform is constant.

The integrator 103 integrates spectrum signals. The integrator 103 is connected to the FFT processor 102, the SNR calculator 104, and the resolution changer 105. The integrator 103 performs integration processing on the spectrum output by the FFT processor 102 any desired number of times, and outputs the spectrum signal subjected to the integration processing to the SNR calculator 104 and the resolution changer 105. The integration processing is performed by integrating the spectrum signals for each range bin in each shot for each same range bin in each shot.

The SNR calculator 104 derives a function of SNR with respect to distance from an SNR value of each distance obtained by observation, receives the spectrum signal output from the integrator 103 as an input, and outputs the SNR and spectrum of each distance to the resolution changer 105.

The resolution changer 105 performs processing of integrating a spectrum of a range bin adjacent to a range bin having a low SNR with a spectrum of the range bin having the low SNR depending on the SNR output from the SNR calculator 104, and outputs a spectrum subjected to the integration processing to the wind speed calculator 106.

The wind speed calculator 106 calculates a wind speed from spectrum data integrated by the resolution changer 105. The wind speed calculator is connected to the resolution changer 105. The wind speed calculator 106 calculates a Doppler shift amount of the laser light from the spectrum signal output by the resolution changer 105, and calculates a wind speed value in the line-of-sight direction of the laser light from the Doppler shift amount. The wind speed calculator 106 outputs a wind speed value in each line-of-sight direction to the wind vector calculator 107.

The wind vector calculator 107 calculates a wind vector from the wind speed value in the line-of-sight direction output by the wind speed calculator 106 and angle information on the line-of-sight direction. The wind vector calculator 107 is connected to the wind speed calculator 106, the scanner 6, and the scanner controller 108. The wind vector calculator 107 calculates the wind vector from the wind speed value in each line-of-sight direction output by the wind speed calculator 106 and angle information on the prism of the scanner 6 obtained via the scanner controller 108, and outputs the wind vector to the scanner controller 108.

The scanner controller 108 generates a control signal for controlling the scanner 6. The scanner controller 108 is connected to the wind vector calculator 107, the scanner 6, and the display 11. The scanner controller 108 generates a control signal for line-of-sight direction switching, from a result of the wind vector calculated by the wind vector calculator 107, and outputs the generated control signal to the scanner 6. The scanner controller 108 holds the angle information obtained from the scanner 6 and also transmits the angle information to the wind vector calculator 107. Furthermore, the scanner controller 108 outputs the calculation result of the wind vector output by the wind vector calculator 107 to the display 11.

For example, a Field Programmable Gate Array (FPGA) logic circuit, a microcomputer, or the like is used for the range bin divider 101, the FFT processor 102, the integrator 103, the SNR calculator 104, the resolution changer 105, the wind speed calculator 106, the wind vector calculator 107, and the scanner controller 108.

Returning to FIG. 21, the description is given of the configuration of the laser radar device.

The display 11 displays the line-of-sight direction wind speed value calculated by the signal processor 10. The display 11 is connected to the signal processor 10. The display 11 displays data calculated by the signal processor 10, for example, the line-of-sight direction wind speed value, its SNR, or the wind vector. For example, a liquid crystal display, an organic Electro Luminescence (EL) display, or the like is used for the display 11. The display 11 may include a storage device such as a Random Access Memory (RAM) or a hard disk, and may store the line-of-sight direction wind speed value, its SNR, or the wind vector, with respect to time.

Next, the operation will be described of the laser radar device according to the first embodiment of the invention.

The optical oscillator 1 oscillates laser light and outputs the oscillated laser light to the optical coupler 2.

The optical coupler 2 distributes the laser light output by the optical oscillator 1 into transmission light and local light at any desired branching ratio, and outputs the transmission light to the optical modulator 3 and outputs the local light to the multiplexing coupler 7. The transmission light is the light output from the optical antenna 5 to the atmosphere, and the local light is the light multiplexed with the received light in the multiplexing coupler 7, for heterodyne detection in the optical receiver 8. The branching ratio of the optical coupler 2 is determined by system design.

For example, the following formula is used for link calculation for the system design.

[Formula 1]

$$SNR = P \cdot \beta \cdot K \cdot \frac{\eta_F}{\left(1 + \left(1 - \frac{L}{F}\right)^2 \left[\frac{\pi (A_c D)^2}{4\lambda L}\right]^2 + \left(\frac{A_c D}{2S_0}\right)^2\right)} \cdot \left[\frac{\lambda \pi D^2}{8hBL^2}\right] \sqrt{N} \quad (1)$$

The symbols $\beta$, K, and $S_0$ represent a backscattering coefficient ($m^{-1}sr^{-1}$), an atmospheric transmittance, and a coherence diameter (m) of scattered light, respectively, and represent parameters representing atmospheric conditions that cannot be controlled by the system. The symbols D, F, N, and L represent a beam diameter (m), a focusing distance (m), an incoherent integration number (times), and an observation distance (m), respectively, and represent parameters that can be changed in the system. The symbols h, $\lambda$, P, $\eta_F$, and B are the Planck's constant ($J_s$), a wavelength (m), transmission light pulse energy (J), Far Field transmission/reception efficiency, reception bandwidth (Hz), respectively, and $A_c$ is an approximation coefficient for replacing a Gaussian beam (Nearest Gaussian Beam (NGB)) vignetted by an optical antenna with a Gaussian beam with a diffraction limit having a high correlation, and L represents an observation distance (m). Vignetting refers to a state in which the Gaussian beam to be transmitted or received is blocked by the effective aperture diameter of the telescope and is partially clipped. When fitting is performed on the clipped Gaussian beam with a Gaussian curve, the above $A_c$ corresponds to a coefficient related to the Gaussian curve.

The optical modulator 3 performs frequency modulation and intensity modulation on the transmission light distributed by the optical coupler 2, and outputs the modulated transmission light to the optical circulator 4. Here, the optical modulator 3 determines a pulse width and a repetition frequency (PRF) of the transmission light. Since the pulse width also corresponds to the distance resolution value, it is also possible that a pulse width corresponding to any desired distance resolution value is set in the signal processor 10 and the signal processor 10 sets the pulse width in the optical modulator 3, and the optical modulator 3 may output a fixed pulse width and PRF set at the time of design. Furthermore, when the output light of the optical modulator 3 is insufficient, an optical amplifier may be added at the subsequent stage of the optical modulator 3. The optical modulator 3 outputs, to the A/D converter 9, a pulse trigger signal indicating the pulse timing when the transmission light is pulsed.

The optical circulator 4 allows the transmission light modulated by the optical modulator 3 to pass through to the optical antenna 5, and outputs the received light received by the optical antenna to the multiplexing coupler 7. The optical circulator 4 separates the transmission light and the received light from each other in this way.

The optical antenna 5 collimates the transmission light and radiates the collimated light into the air. Furthermore, the optical antenna 5 collects scattered light from the aerosol with respect to the transmission light and receives the scattered light as received light. The optical antenna 5 may have a focusing adjustment function.

The scanner 6 receives the control signal output by the signal processor 10, rotates the wedge prism, and arbitrarily changes the direction of the light radiated by the optical antenna 5. Furthermore, the scanner 6 transmits the angle information by outputting an electric signal corresponding to encoder information to the signal processor 10.

The multiplexing coupler 7 multiplexes the local light output by the optical coupler 2 and the received light output by the optical circulator 4, and outputs multiplexed light to the optical receiver 8.

The optical receiver 8 photoelectrically converts the multiplexed light output by the multiplexing coupler 7, frequency-demodulates the received light by heterodyne detection, and outputs the frequency-demodulated received signal to the A/D converter 9.

After receiving the pulse trigger signal generated in the optical modulator 3, the A/D converter 9 performs A/D conversion of the received signal output by the optical receiver 8 at a sampling frequency fs, and outputs the digital signal to the signal processor 10.

Hereinafter, the operation of the signal processor 10 will be described.

Figure 3:
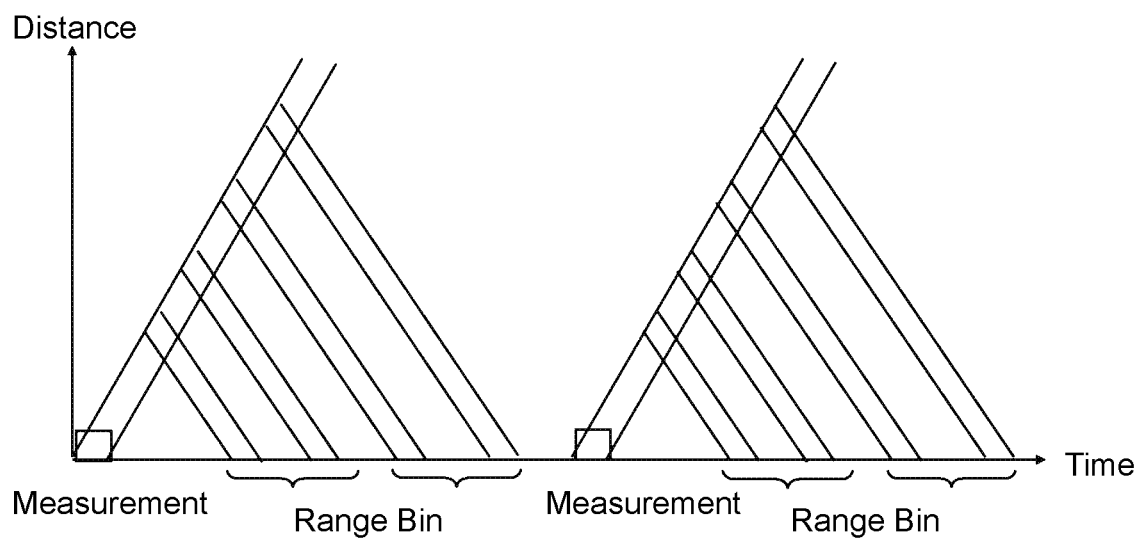
FIG. 3 is a diagram illustrating a relationship between an observation distance and a reception time in the laser radar device according to the first embodiment of the invention.

FIG. 3 is a diagram illustrating a relationship between an observation distance and a reception time in the laser radar device according to the first embodiment of the invention. The range bin divider 101 divides the received signal from each distance into any desired time widths. Hereinafter, the divided time (time gate) is referred to as a range bin. The time width (time gate width) of each range bin corresponds to the distance resolution value. The range bin divider 101 divides a received waveform into any desired number of range bins, and outputs a voltage value of the received waveform in a range bin section to the FFT processor 102.

For example, when the distance resolution is set to Rres, the time width (t) dividing the time waveform subjected to A/D conversion is set at t=2Rres/c (c: speed of light). Thus, when the total number of range bins is M, with a trigger for starting A/D, here, a trigger signal timing from the optical modulator 3 as a reference, the time divided by each range bin is represented by the following formulas.

[Formula 2]

$$Tstart(m) = (m-1)\left(\frac{Rres}{c}\right) + 2Rmin/c \quad (2)$$

[Formula 3]

$$Tend(m) = (m+1)\left(\frac{Rres}{c}\right) + 2Rmin/c \quad (3)$$

[Formula 4]

$$Tcen(m) = (m)\left(\frac{Rres}{c}\right) + 2Rmin/c \quad (4)$$

Tstart is a data acquisition start time of each range bin, Tend is a data acquisition end time of each range bin, m is a range bin number and has a value range of from 1 to M. Rmin is a value for adjusting an observation start distance, that is, a delay timing until A/D conversion is performed on the pulse trigger signal, expressed by a distance value. When the amount of delay of A/D start with respect to the trigger is 0, for example, when it is desired to measure from 40 m, a value such as 40 is inserted in Rmin.

Note that, here, although the range bin division of that time interval is performed, this is not a limitation, and the observation start distance corresponding to Tstart may be determined by a user, or may be set for each range bin, or Tstart and Tend ranges may overlap each other.

The FFT processor 102 performs FFT processing on the time waveform of each range bin acquired by the range bin divider 101 with the number of FFT bins (NFFT) to obtain a received signal spectrum. NFFT represents the number of points (the number of sampling points (also referred to as the number of sample points)) on which the FFT processing is performed, and a value such as 256 is used.

The integrator 103 performs incoherent integration of the number of times (N) designated by the user on the spectrum obtained in each shot. The incoherent integration is performed on spectrum data of each range bin by the following formula.

The integrator 103 performs integration processing on the spectrum data of each range bin in each shot by adding the spectrum data of the same range bin number. The integration processing is as follows when expressed by a mathematical formula.

[Formula 5]

$$S(i, R) = \left(\sum_{n}^{N} SPC(i, n, R)\right) / N \quad (5)$$

SPC(i, n, R) is spectrum data of each shot. S(i, R) is spectrum data subjected to the integration processing. The frequency bin number is represented by i, the shot number is represented by n, and the range bin number is represented by R. By performing the integration processing, it is possible to increase a peak value (signal value) of the spectrum data with respect to a noise value. That is, the SNR can be improved.

Figure 4:
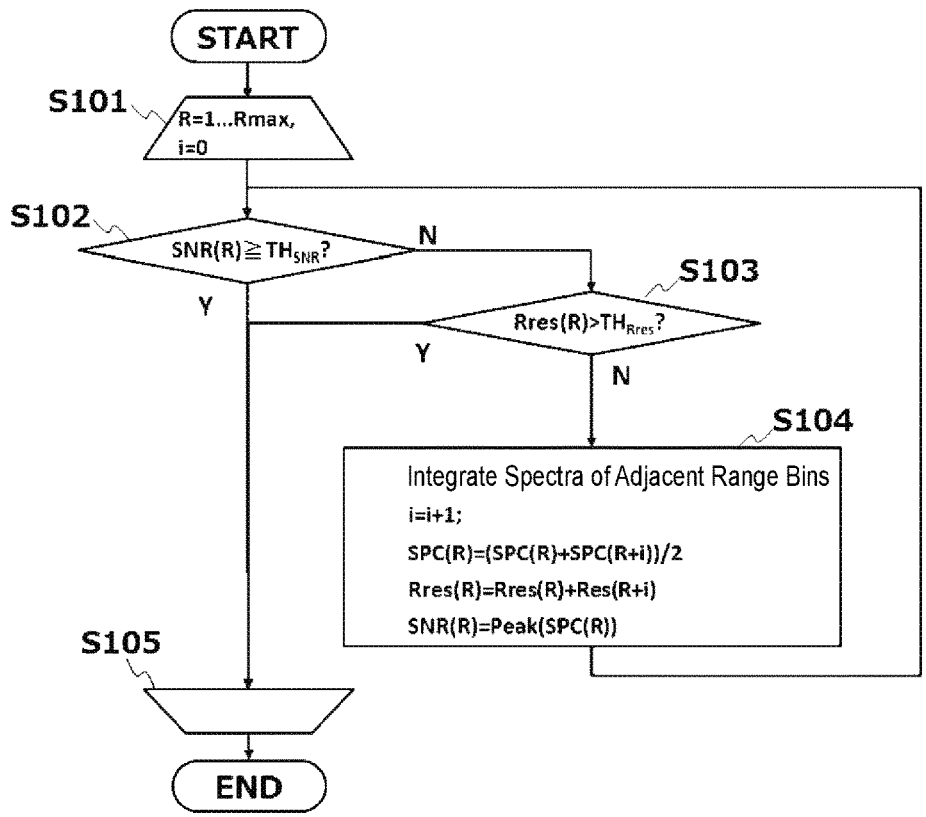
FIG. 4 is a flowchart illustrating processing content of a resolution changer 105 according to the first embodiment of the invention.

FIG. 4 is a flowchart illustrating processing content of the resolution changer 105 according to the first embodiment of the invention. Here, it is assumed that the range bins are divided at equal time intervals.

The resolution changer 105 repeats the processing from step S101 to step S105 from R=1 to R=Rmax.

In step S102, the resolution changer 105 performs determination with respect to the SNR of the spectrum of the range bin R by the following formula.

[Formula 6]

$$SNR(R) \geq TH_{SNR} \quad (6)$$

Here, Rres represents a resolution with which wind speed measurement accuracy can be ensured when the wind speed value is obtained from the spectrum. When the FFT is used, the time gate width decreases when the distance resolution is high, so that the number of sample points reduces and the frequency resolution lowers. Thus, the wind speed measurement accuracy degrades. A value such as Rres=20 m is therefore set, for example. $TH_{SNR}$ is a threshold value for the SNR defined by the system, and is determined in advance depending on the noise level of the system. When the SNR is greater than or equal to the threshold value, it is determined that the signal can be detected, the processing proceeds to step S105, the processing for the range bin R is ended, and the calculation of the next range bin is performed.

On the other hand, when the SNR is less than or equal to the threshold value, the resolution changer 105 determines that signal detection is difficult due to the low SNR, and the processing proceeds to step S103.

In step S103, the resolution changer 105 determines whether or not the distance resolution Rres(R) is greater than an upper limit value $TH_{Rres}$ for the distance resolution set in advance. When Rres(R) is greater than $TH_{Rres}$, the upper limit value of the distance resolution is exceeded, so that the processing proceeds to step S105, the processing for the present range bin ends, and the next loop processing is started.

When Rres (R) is less than $TH_{Rres}$, the resolution changer 105 determines that the distance resolution has a margin since the distance resolution Rres(R) does not exceed the upper limit value $TH_{Rres}$, and the processing proceeds to step S104.

In step S104, the resolution changer 105 integrates a spectrum (SPC(R)) of a target range bin (R) and a spectrum (SPC(R+1)) of a next range bin by the following formula. After the integration, the processing proceeds to step S102, and it is determined whether the SNR obtained by the integration processing of step S104 is less than or equal to the threshold value.

[Formula 7]

$$SPC(R) = \frac{SPC(R) + SPC(R+1)}{2} \quad (7)$$

The distance resolution at this time is given by the following formula.

[Formula 8]

$$Rres(R) = Rres(R) + Rres(R+1) \quad (8)$$

That is, the processing of step S104 means improving the SNR at the sacrifice of the distance resolution.

Figure 5:
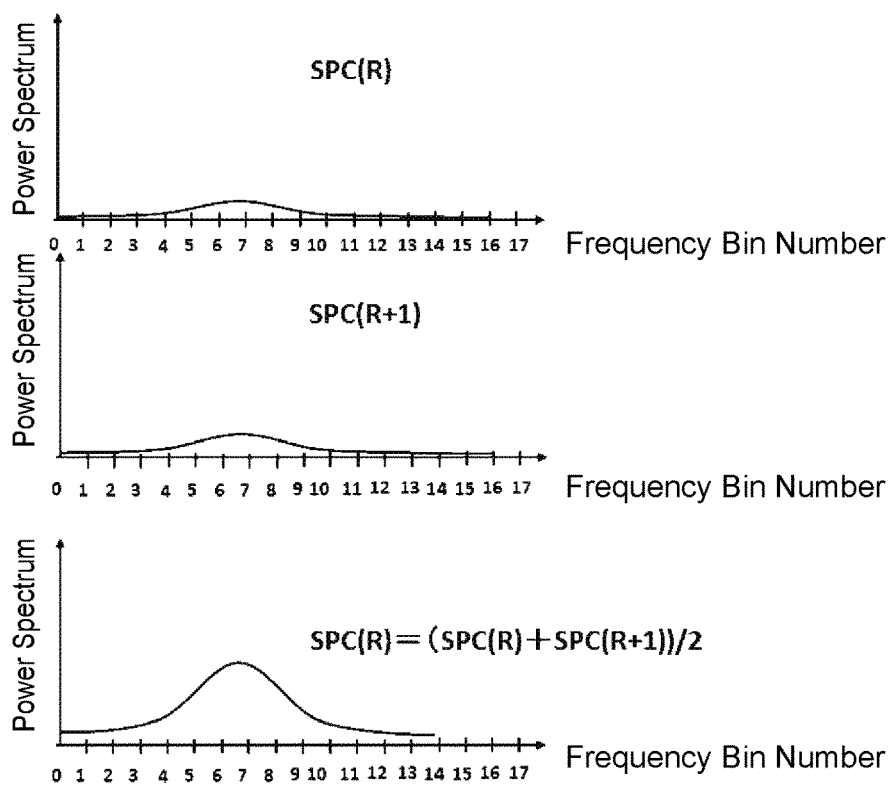
FIG. 5 is a conceptual diagram explaining processing of improving an SNR in step S104 of the resolution changer 105 according to the first embodiment of the invention.

FIG. 5 is a conceptual diagram explaining processing of improving the SNR in step S104 of the resolution changer 105 according to the first embodiment of the invention. The resolution changer 105 obtains a new SPC(R) by adding the spectrum values of the frequency bin numbers corresponding to each other in SPC(R) and SPC(R+1). After the spectrum of each range bin is calculated, the spectrum values with the same frequency bin number are added as they are without changing the number of spectrum data points and the time gate width, so that the amount of calculation is small and the processing can be carried out at high speed.

The resolution changer 105 improves the SNR in this way and repeats the determination based on the threshold value $TH_{SNR}$, thereby enabling measurement with the minimum distance resolution. However, as a condition for achieving this, there is a condition that the wind is uniform.

Figure 6:
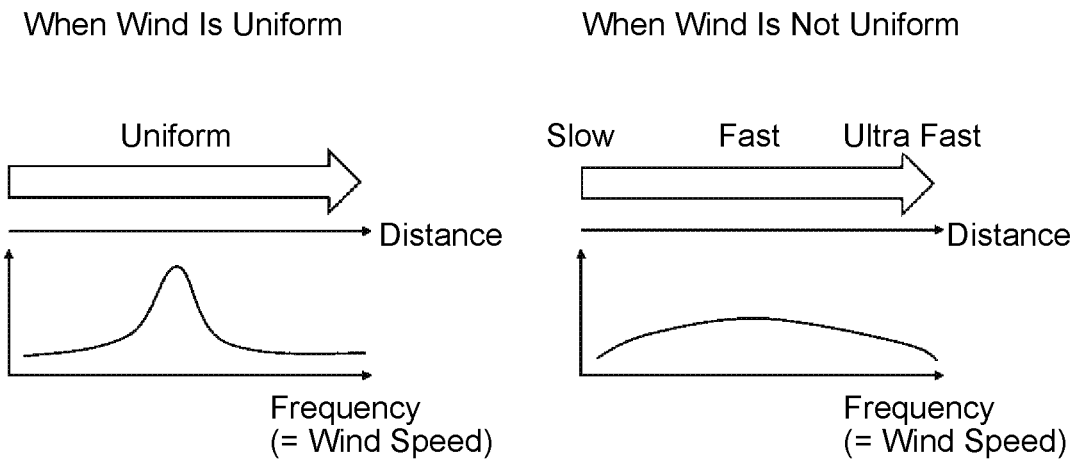
FIG. 6 is a conceptual diagram explaining a precondition in step S104 of the resolution changer 105 according to the first embodiment of the invention.

FIG. 6 is a conceptual diagram explaining a precondition in step S104 of the resolution changer 105 according to the first embodiment of the invention. When the wind is uniform, the signals are accumulated since the signal components exist at the same frequency, but in the case of turbulence or a gust, the wind is not uniform and the signal components are not accumulated. For that reason, $TH_{SNR}$ is less likely to be exceeded even if the integration is repeated, and moreover, the probability of overlooking the turbulence and gust increases due to excessive degradation of the distance resolution.

As a measure for suppressing the turbulence and gust overlooking, the threshold value $TH_{Rres}$ for the distance resolution is set in step S103. The above problem is solved by degrading the distance resolution and setting an upper limit for accumulating signals.

Regarding this $TH_{Rres}$, the magnitude of the turbulence to be detected or the continuation distance of the gust is set to the threshold value. Furthermore, the upper limit value may be determined by the user as illustrated on the left, or may be set using Artificial Intelligence (AI). This is because a method that follows an empirical rule is desirable for a natural phenomenon such as the gust. Temperature, atmospheric pressure, humidity, date and time, topography, coherence length of a gust generated there, and a gust wind speed value are input as AI learning data. Then, by inputting information such as date and time, topography, and temperature, the coherence length of the gust that can occur is calculated and set as the upper limit value. For the conventional gust information, for example, an existing database such as the Japan Meteorological Agency may be used, or an actual measurement value observed by the laser radar device may be used, but the information is not limited to this. Note that, here, the method has been described of integrating the spectrum of the range bin of R and the spectrum of the range bin of R+1; however, the spectra of R−1 and R, or the spectra of R−1 and R and R+1 may be integrated, and range bins having the same frequency bin numbers and corresponding frequency bin numbers may be integrated.

The resolution changer 105 repeats the loop from step S101 to step S105 from R=1 to R=Rmax, and then ends the processing of this flow.

The wind vector calculator 107 calculates a wind vector by using vector composition or the Velocity Azimuth Display (VAD) method. In the case of vector composition, for example, the wind speed in the line-of-sight direction (Vr) is expressed by the following formula using a horizontal wind speed in the east-west direction (U), a horizontal wind speed in the north-south direction (V), a vertical wind speed (W), an elevation angle (θ), and an azimuth angle (φ) with reference to the north.

[Formula 9]

$$Vr = U \sin \phi \sin \theta + V \cos \phi \sin \theta + V \cos \phi \sin \theta + W \cos \theta \quad (9)$$

When, for example, line-of-sight direction wind speed values in three directions are obtained by using this formula, U, V, and W can be calculated by solving simultaneous equations. As a result, a three-dimensional wind vector is obtained.

The scanner controller 108 generates a control signal for operating the scanner to switch the line-of-sight directions. The scanner 6 drives the stepping motor in the scanner by the control signal from the scanner controller 108 to cause the stepping motor to operate by desired steps, thereby performing an operation to a desired angle. Furthermore, the scanner 6 transmits an angle signal from the mounted encoder to the scanner controller 108, and the scanner controller 108 holds the angle information after the operation.

The display 11 stores, in the memory, information such as the line-of-sight direction wind speed value calculated by the signal processor 10, the SNR of the line-of-sight direction wind speed value, or the wind vector, and displays the information.

As described above, according to the first embodiment of the invention, it is possible to extend the measurement distance even after the distance resolution is set, by integrating the spectra of the adjacent range bins depending on the SNR and improving the SNR.

Note that, in the present configuration, the pulse type laser radar device is described as a premise, but a Continuous Wave (CW) system may be used, and is not limited to this. Furthermore, in the present configuration, the optical connection method based on the optical fiber is described, but the connection method may be a spatial propagation type without using the optical fiber.

Furthermore, the present laser radar device may have a configuration in which an optical switch is inserted between the circulator and the telescope and the scanner is removed, instead of the above-described scanner configuration, and is not limited to this. At this time, for example, a mechanical optical switch used in communication, a Micro Electro Mechanical Systems (MEMS) optical switch, or the like is used for the optical switch.

Furthermore, the function of each constituent element of the signal processor 10 may be executed by hardware such as FPGA, or may be executed by software in such a manner that a processor reads and executes a program representing the function of each constituent element stored in the memory.

According to the present embodiment, the determination by the SNR is performed on the spectrum of each range bin obtained by one measurement, and when the SNR is insufficient, the spectra of adjacent range bins are integrated, whereby the distance resolution is degraded and the SNR is therefore improved. As a result, the SNR is improved by sacrificing the resolution of the region where the SNR is insufficient without increasing the number of measurements (without degrading the frame rate), so that unnecessary degradation of measurement accuracy can be suppressed.

Second Embodiment

In a second embodiment, as compared with the first embodiment, processing content of a signal processor 10B, addition of an SNR model calculator 109 (an example of an SNR model calculator) in the signal processor 10B, and processing content of a resolution changer 105B are different, and the number of range bins to be integrated is derived from a link calculation formula, whereby the number of calculation trials is improved.

Figure 7:
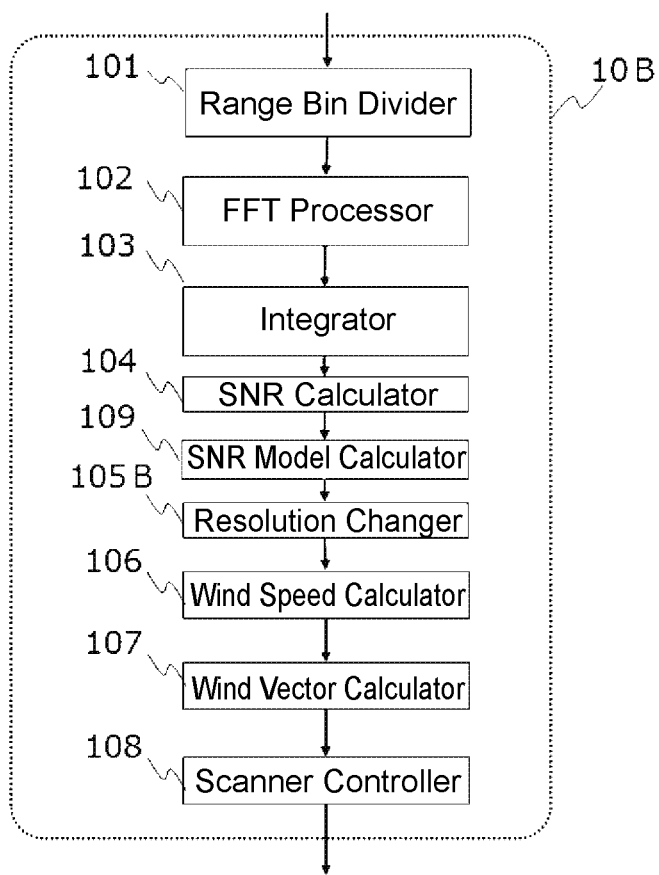
FIG. 7 is a configuration diagram illustrating a configuration example of a signal processor 10B according to a second embodiment of the invention.

FIG. 7 is a configuration diagram illustrating a configuration example of the signal processor 10B according to the second embodiment of the invention.

The SNR model calculator 109 receives the SNR value of each distance (range bin) obtained from the SNR calculator 104 as an input, and calculates an estimated value of the SNR for each range bin. Then, the number of range bins is calculated that is required to improve the SNR up to the calculated estimated value of the SNR, and the calculated number of range bins and estimated value of the SNR are output to the resolution changer 105B.

The resolution changer 105B changes the distance resolution in accordance with the number of range bins to be added output from the SNR model calculator 109, and outputs to the wind speed calculator 106 a flag of a result of validity determination performed on a result of the change, and a spectrum of a result of the adding.

In the signal processor 10B, the range bin divider 101, the FFT processor 102, the integrator 103, the SNR calculator 104, the wind speed calculator 106, the wind vector calculator 107, and the scanner controller 108 that are other constituents are the same as those of the first embodiment, and thus the description will be omitted.

Figure 8:
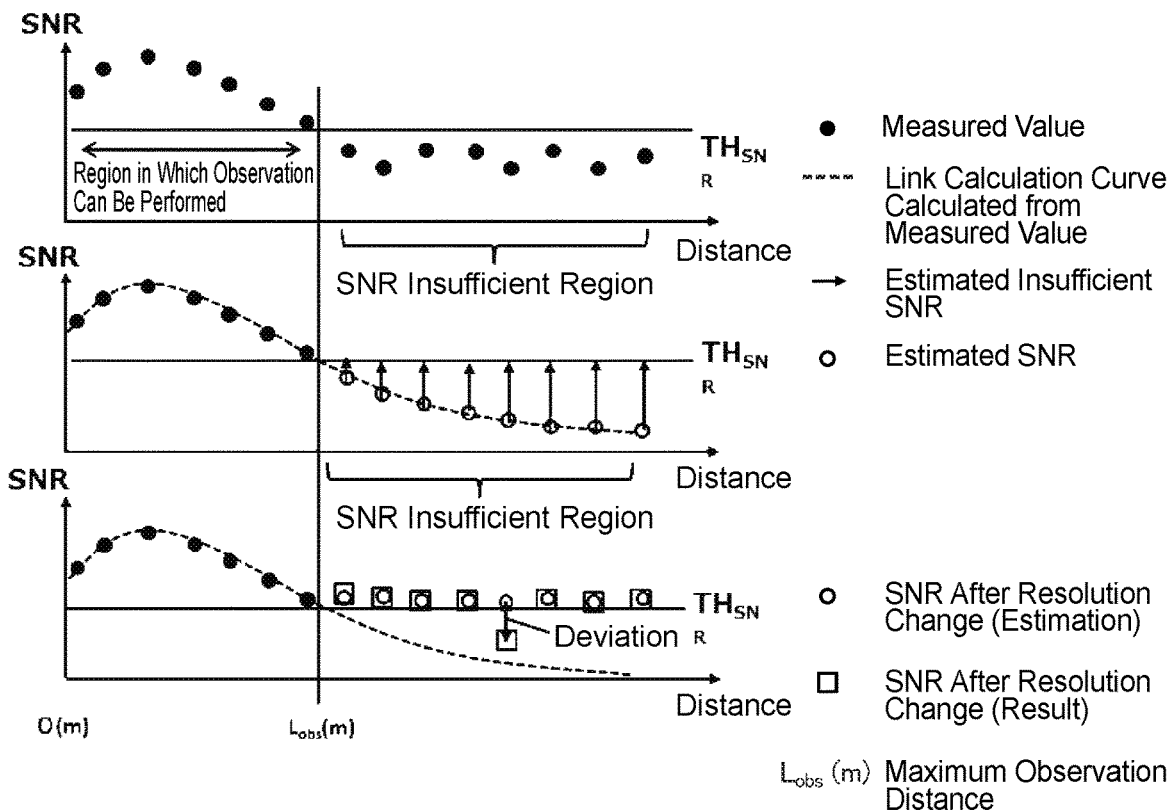
FIG. 8 is a conceptual diagram explaining processing content of the signal processor 10B according to the second embodiment of the invention.

FIG. 8 is a conceptual diagram explaining the processing content of the signal processor 10B according to the second embodiment of the invention. The SNR model calculator 109 estimates a value of β in formula (1) by using formula (1) and the SNR value at a distance shorter than the maximum observation distance ($L_{obs}$). When the maximum observation range bin of a region (distance from 0 (m) to $L_{obs}$ in FIG. 8) that can be observed is M, the value of β in formula (1) is calculated so that a value of Q below is minimized. In the following formula, $SNR_{theory}$ is the SNR obtained by formula (1).

[Formula 10]

$$Q(\beta) = \sum_{i=1}^{M} abs(SNR(i) - SNR_{theory}(i)) \qquad (10)$$

Here, K and $S_0$ that represent the atmospheric environment are typical values, for example, K is $4.2 \times 10^{-5}$ (/m), and $S_0$ is calculated by the following formula. Cn represents an atmospheric structure coefficient, and a value such as $1.7 \times 10^{-14}$ ($m^{-2/3}$) is used. L represents a distance, and λ represents a wavelength.

[Formula 11]

$$S_0 = \left(1.1 \times \left(\frac{2\pi}{\lambda}\right)^2 LCn\right)^{-\frac{3}{5}} \qquad (11)$$

These values are used, and for the system parameters D, F, N, L, and Ac, known values are used. Here, the minimum value of Q is calculated with one variable of β to reduce the calculation load, but the minimum value of Q may be calculated with three variables of β, K, and So.

The SNR model calculator 109 compares the actually measured SNR with the SNR estimated from formula (1) and β, for the range bins after $L_{obs}$, and calculates the insufficient SNR in each range bin.

Regarding the SNR to be improved when one adjacent range bin is integrated, when the wind is uniform, the SNR is improved by $\sqrt{M}$ times (M is the total number of range bins to be integrated, including itself). From this, the number of range bins to be integrated is calculated. For example, a natural number M that satisfies the following formula is calculated by using the estimated $SNR_{theory}$ and the SNR threshold value $TH_{SNR}$ to be reached. M(R) represents the number of range bins to be added. The SNR model calculator 109 outputs the calculated number of range bins (M) and the estimated value of the SNR ($SNR_{theory}$) to the resolution changer 105B.

[Formula 12]

$$M(R) > \left(\frac{TH_{SNR}}{SNR_{theory}(R)}\right)^2 \qquad (12)$$

Here, the SNR to be achieved is set as $TH_{SNR}$; however, in consideration of an estimation error, a threshold value $TH_{SNRup}$ (for example, $TH_{SNRUP} > TH_{SNR}$) including the estimation error may be set.

Figure 9:
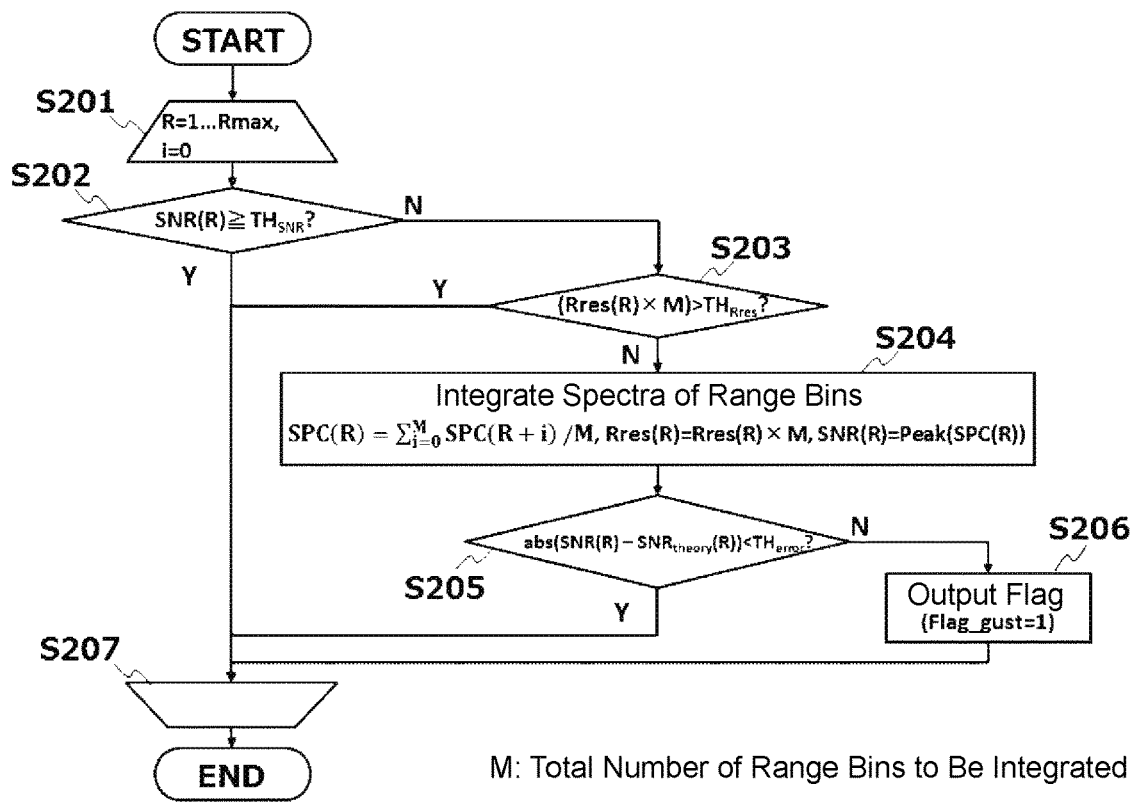
FIG. 9 is a flowchart illustrating processing content of a resolution changer 105B according to the second embodiment of the invention.

FIG. 9 is a flowchart illustrating the processing content of the resolution changer 105B according to the second embodiment of the invention.

The resolution changer 105B repeats the processing from step S201 to step S207 from R=1 to R=Rmax.

In step S202, the resolution changer 105B performs determination with respect to the SNR of the spectrum of the range bin R by formula (6). When the SNR of the measurement result is greater than or equal to the threshold value, it is determined that the signal can be detected, the processing proceeds to step S207, the processing for the range bin R is ended, and the calculation of the next range bin is performed.

On the other hand, when the SNR of the measurement result is less than or equal to the threshold value, the resolution changer 105B determines that signal detection is difficult due to the low SNR, and the processing proceeds to step S203.

In step S203, the resolution changer 105B multiplies the distance resolution Rres(R) and M calculated by the SNR model calculator 109 together, and determines whether or not the multiplication result is greater than the upper limit value $TH_{Rres}$ for the distance resolution set in advance. When Rres(R)×M is greater than $TH_{Rres}$, the upper limit value of the distance resolution is exceeded, so that the processing proceeds to step S207, the processing for the present range bin number ends, and the next loop processing is started.

When Rres(R)×M is less than $TH_{Rres}$, the resolution changer 105B determines that the distance resolution has a margin since the distance resolution Rres(R)×M does not exceed the upper limit value $TH_{Rres}$, and the processing proceeds to step S204.

In step S204, the resolution changer 105B integrates the spectra of the range bins by the following formula using M output by the SNR model calculator 109. After the integration, the processing proceeds to step S205, and it is determined whether the SNR obtained by the integration processing of step S204 is less than or equal to the threshold value.

[Formula 13]

$$SPC(R) = \frac{\sum_{i=0}^{M} SPC(R+i)}{M} \qquad (13)$$

With the above processing, the distance resolution is as follows. Furthermore, the signal to noise ratio is SNR(R)=peak(SPC(R)).

[Formula 14]

$$Rres(R) = Rres(R) \cdot M \qquad (14)$$

In step S205, the resolution changer 105B determines whether the SNR obtained by changing the distance resolution in step S204 is less than or equal to a threshold value as compared with the SNR estimated in formula (1) by the following formula. As a result, the resolution changer 105B determines whether or not a gust of wind has occurred in the range bin.

[Formula 15]

$$abs(SNR(R) - SNR_{theory}(R)) < TH_{error} \qquad (15)$$

In the above formula, SNR(R) is the SNR obtained in step S204, $SNR_{theory}(R)$ is the SNR estimated by the SNR model calculator 109 in formula (1), and β determined by the SNR model calculator 109 is used for β in formula (1).

When a difference between the SNR obtained in step S204 and the SNR(R) estimated in formula (1) is less than $TH_{error}$, it is determined that the wind is uniform in this range bin and there is no gust of wind, the spectrum SPC(R) obtained in step S204 is output to the wind speed calculator 106, and the processing proceeds to step S207.

When the difference between the SNR obtained in step S204 and the SNR(R) estimated in formula (1) is greater than or equal to $TH_{error}$, it is determined that a gust of wind (gust) may be included in this range bin, the processing proceeds to step S206, and a flag is set.

In step S206, the resolution changer 105B outputs the flag (Flag_gust=1) regarding the gust and the spectrum SPC(R) obtained in step S204 to the wind speed calculator 106, for the range bin R. This processing corresponds to an effect of suppressing gust detection omission. Note that, this processing may be processing using the received spectrum width instead of the deviation of the SNR. In that case, a spectrum width $S_w$ is calculated from the spectrum SPC of the received signal by the following formula. The frequency is represented by f.

[Formula 16]

$$S_w = \frac{\int SPC(f) f^2 df}{\int SPC(f) df} \quad (16)$$

A theoretical received spectrum width $S_{w\_theory}$ is expressed by the following formula. The line width of the local light is represented by $w_L$, the line width of the transmission light is represented by $W_T$, and the Doppler variation due to wind is represented by $w_w$.

[Formula 17]

$$S_{w,theory} = \sqrt{(w_L + w_T + w_w)} \quad (17)$$

By using the fact that $w_w$ is 0 and $w_L$ and $w_T$ have fixed values when the wind is uniform, and by using a threshold value $TH_{sw}$, the following formula can be used instead of formula (15).

[Formula 18]

$$Sw(R) - S_{w_{theory}}(R) < TH_{Sw} \quad (18)$$

However, here, the processing load for calculating the spectrum width is reduced by using the deviation of the SNR.

As described above, according to the second embodiment of the invention, by estimating the amount of the distance resolution and the number of integration range bins necessary to improve the amount of insufficient SNR derived by using the link calculation formula, the number of calculation trials of the spectrum SPC and SNR can be reduced. Furthermore, it is possible to detect a steep wind speed change such as a gust of wind from a state of deviation between the link calculation formula and the improved SNR.

Third Embodiment

A third embodiment differs from the first and second embodiments in processing content of a signal processor 10C. In the signal processor 10C of the third embodiment, gust detection processing is added, and a gust model is created. The wind speed at each distance is derived from the created model, and when the spectra are integrated, the center frequency is shifted to the estimated wind speed value at each distance, and then integration is performed. As a result, the spectrum width can be made constant, so that the SNR can be improved closer to the theoretical value. On the other hand, when the obtained SNR is less than the estimated value, it suggests that the gust model does not fit, that is, there is no gust, or the model itself does not match, so that it is determined that measurement is not possible.

Figure 10:
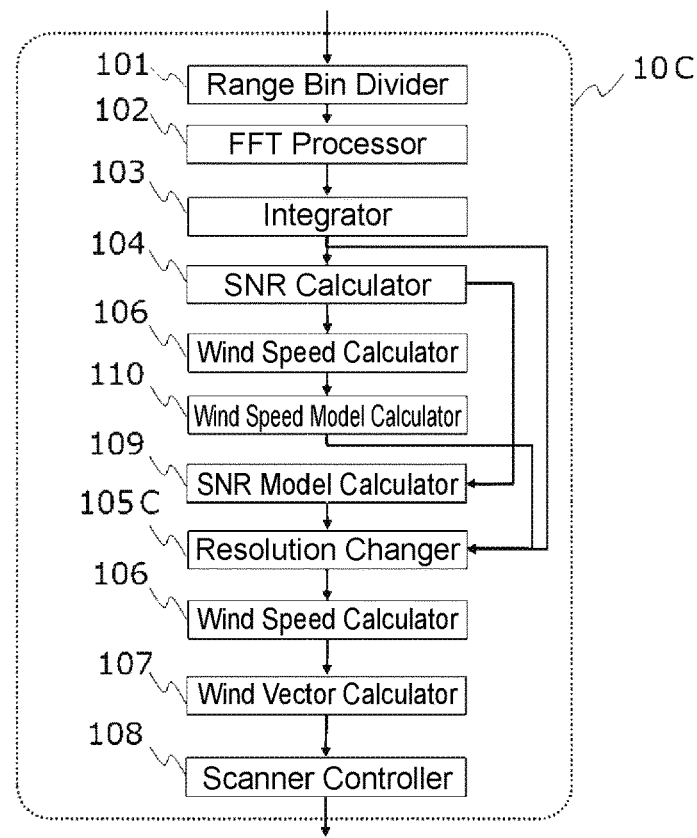
FIG. 10 is a configuration diagram illustrating a configuration example of a signal processor 10C according to a third embodiment of the invention.

FIG. 10 is a configuration diagram illustrating a configuration example of the signal processor 10C according to the third embodiment of the invention.

The differences from the second embodiment will be mainly described below.

A wind speed model calculator 110 (an example of a wind speed model calculator) receives a wind speed value of each range bin output from the wind speed calculator 106 as an input, and outputs an estimated value of the wind speed value of the range bin that cannot be measured.

A resolution changer 105C receives the estimated value of the SNR of each range bin output by the SNR model calculator 109 and the estimated wind speed value of each range bin output by the wind speed model calculator 110 as inputs, and outputs the spectrum of each range bin and the flag of gust occurrence.

In the signal processor 10C, the range bin divider 101, the FFT processor 102, the integrator 103, the SNR calculator 104, the wind speed calculator 106, the wind vector calculator 107, the scanner controller 108, and the SNR model calculator 109 that are constituents other than the wind speed model calculator 110 are the same as those of the second embodiment, and thus the description will be omitted.

Figure 11:
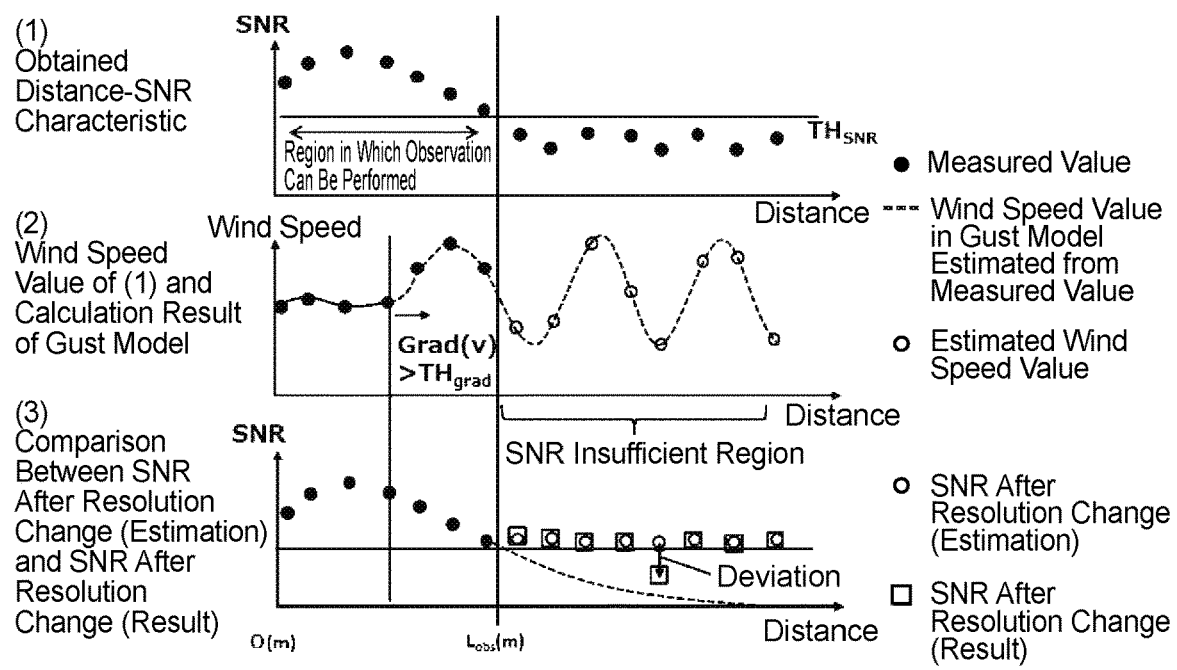
FIG. 11 is a conceptual diagram explaining processing content of the signal processor 10C according to the third embodiment of the invention.

FIG. 11 is a conceptual diagram explaining the processing content of the signal processor 10C according to the third embodiment of the invention.

FIG. 11(1) illustrates a measured distance-SNR characteristic output from the SNR calculator 104. The spectrum in the range bin having the SNR greater than or equal to the threshold value $TH_{SNR}$ is output to the wind speed calculator 106.

FIG. 11(2) illustrates a wind speed value estimated by the wind speed model calculator 110 on the basis of the wind speed value output by the wind speed calculator 106 in the range bin having the SNR less than or equal to the threshold value $TH_{SNR}$. The wind speed model calculator 110 outputs the wind speed value estimated by using the wind speed value output by the wind speed calculator 106 to the resolution changer 105C.

FIG. 11(3) illustrates an SNR improved by the resolution changer 105C performing a change of the distance resolution and integration processing of the spectrum by using the wind speed value estimated by the wind speed model calculator 110, and an SNR estimated by the SNR model calculator 109. By comparing the SNR improved by the resolution changer 105C with the SNR estimated by the SNR model calculator 109, the wind speed estimation by the wind speed model calculator 110 is verified and the presence or absence of a gust is determined.

Figure 12:
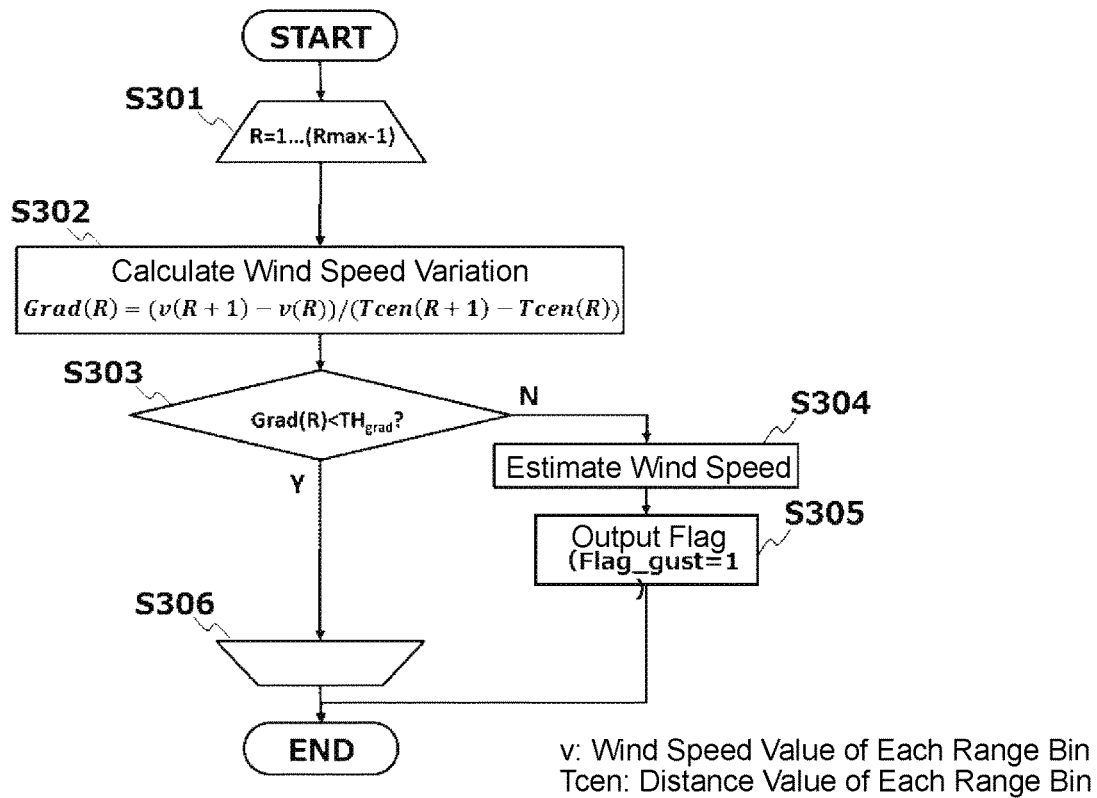
FIG. 12 is a flowchart illustrating processing of a wind speed model calculator 110 according to the third embodiment of the invention.

FIG. 12 is a flowchart illustrating processing of the wind speed model calculator 110 according to the third embodiment of the invention.

The wind speed model calculator 110 repeats the processing from step S301 to step S306 from R=1 to R=Rmax.

In step S302, the wind speed model calculator 110 calculates a wind speed gradient by the following formula by using the wind speed value and distance value of the range bin.

[Formula 19]

$$Grad(R)=(v(R+1)-v(R))/(Tcen(R+1)-Tcen(R)) \quad (19)$$

Here, v(R) is the wind speed value of the range bin R, and Tcen(R) is the distance value of the range bin R.

In step S303, the wind speed model calculator 110 determines whether or not a wind speed gradient Grad(R) calculated in step S203 is less than a threshold value $TH_{grad}$.

When Grad(R) is less than $TH_{grad}$, it is determined that no gust has occurred since the gradient is less than or equal to the threshold value, the processing proceeds to step S306, and the processing for the present range bin number ends. Then, the loop processing of the next range bin is started.

When Grad(R) is greater than $TH_{grad}$, the wind speed model calculator 110 determines that a gust has occurred, and extracts wind speed values (v(R) . . . v($R_k$)) after this range bin and having the SNR greater than or equal to $TH_{SNR}$, and the processing proceeds to step S304. Here, $R_k$ is a range bin number up to $L_{obs}$ in FIG. 11, and is the maximum range bin number for which the SNR is higher than $TH_{SNR}$ and the wind speed value can be calculated.

In step S304, the wind speed model calculator 110 applies fitting to the wind speed values (v(R) . . . v($R_k$)) output in step S303 by the least squares method using the following formula.

[Formula 20]

$$v_e(L)=A \sin(2\pi f_r \cdot L) \quad (20)$$

The estimated wind speed value is represented by $v_e$ and corresponds to the broken line in FIG. 11(2). The spatial variation frequency is represented by $f_r$, the distance is represented by L, and the wind speed amplitude is represented by A. The $v_e$ at a distance farther than $L_{obs}$ is estimated by using $f_r$, L, and A determined by fitting. That is, $v_e(R_k)$ . . . V($R_{max}$) are estimated.

In step S305, the wind speed model calculator 110 outputs $v_e(R_k)$ . . . V($R_{max}$) and the flag (Flag_gust=1) to the resolution changer 105C, and the processing exits the loop from step S301 to step S306 and ends.

Next, processing content of the resolution changer 105C will be described.

Figure 13:
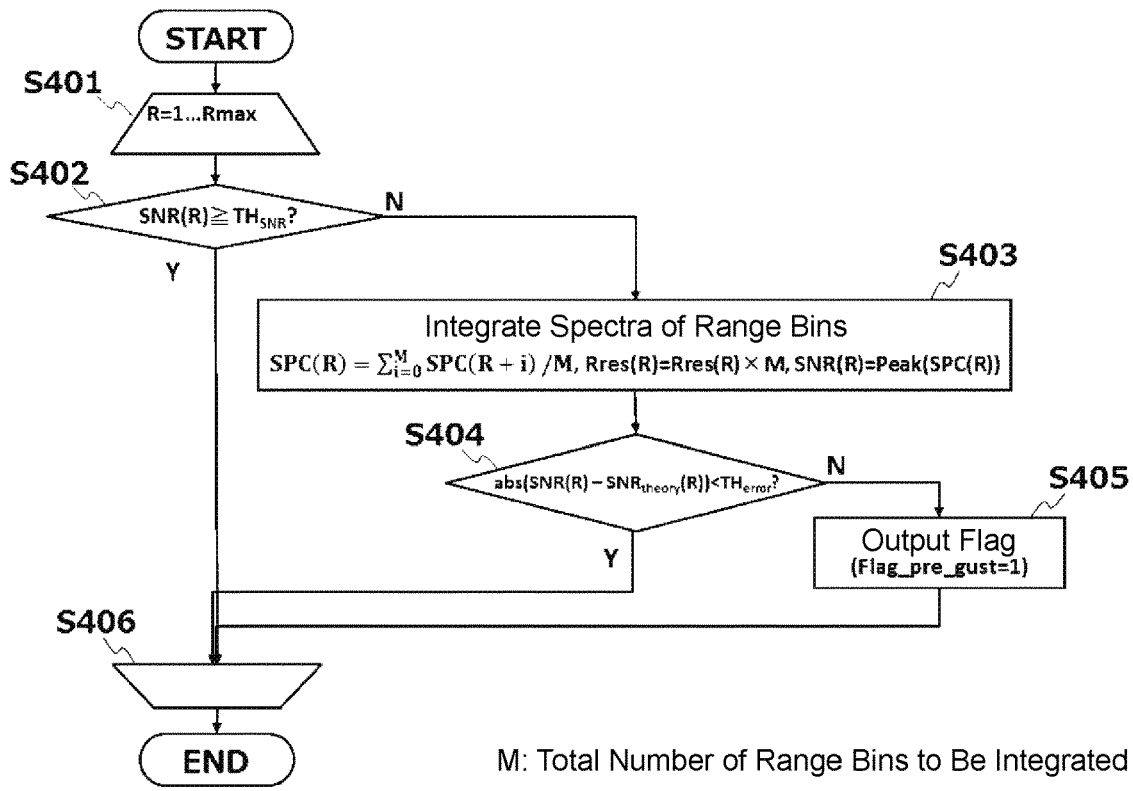
FIG. 13 is a flowchart illustrating processing content of a resolution changer 105C according to the third embodiment of the invention.

FIG. 13 is a flowchart illustrating the processing content of the resolution changer 105C according to the third embodiment of the invention.

The resolution changer 105C repeats the processing from step S401 to step S406 from R=1 to R=Rmax.

In step S402, the resolution changer 105C performs determination with respect to the SNR of the spectrum of the range bin R by formula (6). When the SNR of the measurement result is greater than or equal to the threshold value, it is determined that the signal can be detected, and the processing proceeds to step S406. Thus, the resolution changer 105C performs the processing of step S403 on the range bin having the SNR less than $TH_{SNR}$.

In step S403, using the wind speed values ($V_e(R_k)$ . . . $V_e(R_{max})$) estimated by the wind speed model calculator 110, the resolution changer 105C changes the distance resolution and performs integration of the spectra by using the formula (12) and the formula (13). At that time, the integration is performed so that the Doppler shift components fd corresponding to the wind speed values estimated by the wind speed model calculator 110 match each other. The Doppler shift component is fd(R)=2$v_e$(R)/λ. Furthermore, the signal to noise ratio is SNR(R)=peak(SPC(R)). The above SPC(R) is the spectrum after the integration in formula (12).

Figure 14:
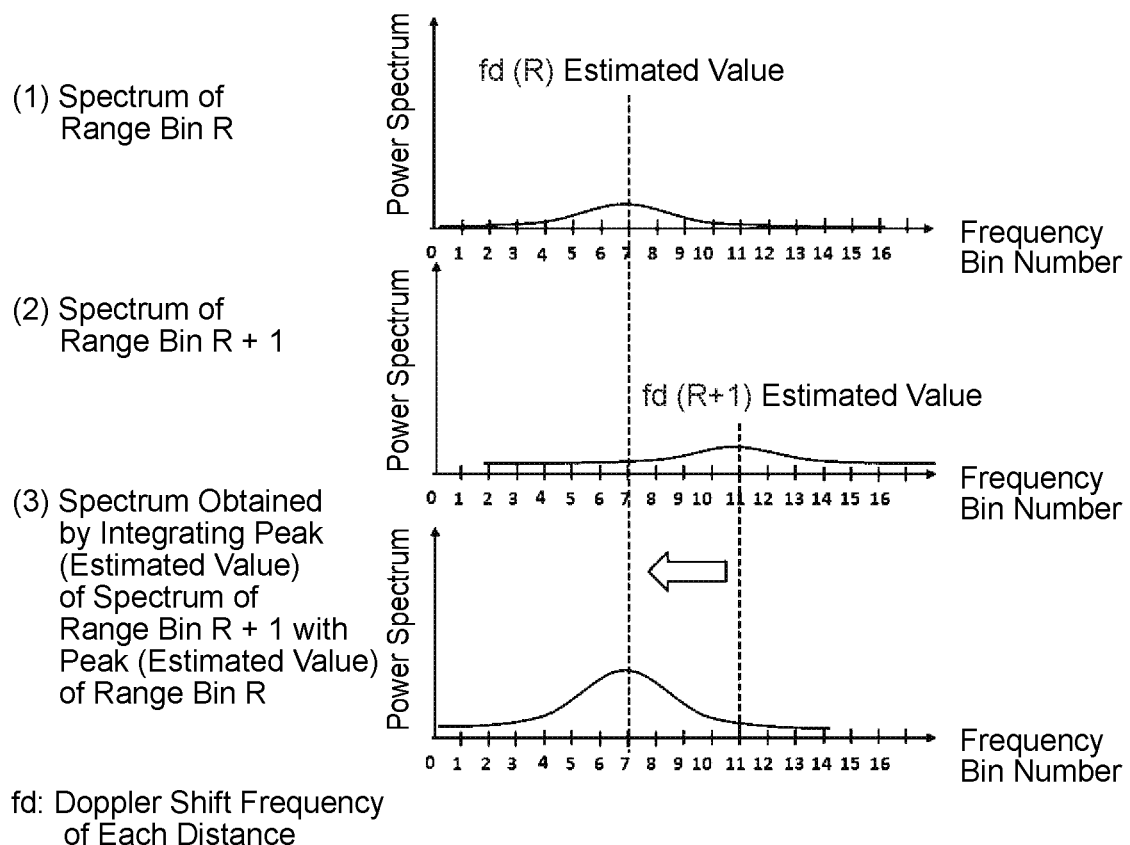
FIG. 14 is a conceptual diagram explaining processing content of step S403 according to the third embodiment of the invention.

FIG. 14 is a conceptual diagram explaining processing content of step S403 according to the third embodiment of the invention.

FIG. 14(1) illustrates a spectrum measured in the range bin R. Here, fd(R) corresponds to $v_e$(R).

FIG. 14(2) illustrates a spectrum measured in the range bin R+1. Here, fd(R+1) corresponds to $v_e$(R+1).

FIG. 14(3) is an integrated spectrum obtained by integration by shifting the frequency range bin numbers so that fd(R) and fd(R+1) match each other. Specifically, when the frequency bin number of fd(R) is 7 and the frequency bin number of fd(R+1) is 11, −4 is added to the frequency bin number of R+1, and integration is performed. When the frequency bin number is negative after adding −4, the maximum value of the frequency bin number is added. When the maximum value of the frequency bin number is 16, the spectrum value of the frequency bin number of R and the spectrum value of the frequency bin number of R+1 are integrated as follows.

| Frequency bin number of R | | Frequency bin number of R + 1 |
|---|---|---|
| 1 | + | 5 |
| 2 | + | 6 |
| 3 | + | 7 |
| 4 | + | 8 |
| 5 | + | 9 |
| 6 | + | 10 |
| 7(fd(R)) | + | 11(fd(R + 1)) |
| 8 | + | 12 |
| 9 | + | 13 |
| 10 | + | 14 |
| 11 | + | 15 |
| 12 | + | 16 |
| 13 | + | 1 |
| 14 | + | 2 |
| 15 | + | 3 |
| 16 | + | 4 |

In step S404, the resolution changer 105C determines by formula (15) whether the SNR obtained in step S403 by changing the distance resolution and integrating the spectra is less than or equal to a threshold value as compared with the SNR estimated by formula (1). As a result, the resolution changer 105C determines whether or not a gust of wind has occurred in the range bin in which the distance resolution has been changed.

When the left side of the formula (15) is less than $TH_{error}$, it is determined that the wind speed estimation is correct, the spectrum SPC (R) obtained in step S403 is output to the wind speed calculator 106, the processing proceeds to step S406, and the loop processing for the present range bin ends. Then, the processing proceeds to the next range bin R+1.

When the left side of formula (15) is greater than or equal to $TH_{error}$, it means that the gust model for which the wind speed is estimated is different, or that there is no gust, and the processing proceeds to step S405, and a flag of false detection is set.

In step S405, the resolution changer 105C outputs the flag of false detection (Flag_pre_gust=1) regarding the gust and the spectrum SPC(R) obtained in step S403 to the wind speed calculator 106, for the range bin R in which the distance resolution has been changed. Then, the processing proceeds to step S406, and the loop processing for the present range bin ends. Then, the processing proceeds to the next range bin R+1.

As described above, according to the third embodiment of the invention, the estimation processing of the wind speed value is added, and the integration processing is performed after the peaks of the spectra are matched by using the estimated wind speed value, whereby the SNR can be improved more efficiently.

REFERENCE SIGNS LIST

1: optical oscillator, 2: optical coupler, 3: optical modulator, 4: optical circulator, 5: optical antenna, 6: scanner, 7: multiplexing coupler, 8: optical receiver, 9: A/D converter, 10, 10B, 10C: signal processor, 11: display, 101: range bin divider, 102: FFT processor, 103: integrator, 104: SNR calculator, 105, 105B, 105C: resolution changer, 106: wind speed calculator, 107: wind vector calculator, 108: scanner controller, 109: SNR model calculator, 110: wind speed model calculator

The invention claimed is:
1. A laser radar device comprising:
an optical oscillator oscillating laser light;
an optical modulator modulating the laser light oscillated by the optical oscillator;
an optical antenna radiating the laser light modulated by the optical modulator to an atmosphere, and receiving scattered light from a radiation target as received light;
an optical receiver performing heterodyne detection on the received light received by the optical antenna; and
a signal processor calculating for a range bin a spectrum of a received signal obtained by the heterodyne detection by the optical receiver, calculating a signal to noise ratio of the range bin, and integrating the spectrum of the range bin and spectra of one or more range bins adjacent to the range bin when the signal to noise ratio is less than or equal to a threshold value, wherein the signal processor includes:
a range bin divider dividing the received signal into range bins each having a set fixed time gate width;
a fast Fourier transform processor calculating a spectrum of the received signal for each of the range bins, by performing Fourier transform on the received signal divided by the range bin divider at a fixed number of set sampling points;
an SNR calculator obtaining the signal to noise ratio with respect to distance, from the spectrum calculated by the fast Fourier transform processor;
a resolution changer performing integration of a spectrum of a range bin being one of the range bins and spectra of one or more range bins adjacent to the range bin while maintaining the time gate width, when the signal to noise ratio calculated by the SNR calculator for the range bin is less than or equal to the threshold value;
a wind speed calculator calculating a wind speed value of the radiation target from a spectrum obtained as a result of the integration performed by the resolution changer;
a wind vector calculator calculating a wind vector from the wind speed value calculated by the wind speed calculator;
an SNR model calculator calculating the number of range bins to be integrated from the signal to noise ratio calculated by the SNR calculator and a signal to noise ratio estimated by a link calculation formula; and
a wind speed model calculator calculating a wind speed gradient using the wind speed value, the wind speed value being calculated by the wind speed calculator from the spectrum calculated by the fast Fourier transform processor, and estimating a wind speed value by a local wind model when the wind speed gradient calculated is greater than or equal to a threshold value,
wherein the resolution changer integrates spectra of the range bins in accordance with the number of range bins to be integrated calculated by the SNR model calculator and in such a manner that Doppler shift components corresponding to wind speed values estimated by the wind speed model calculator match each other.

* * * * *